Feb. 2, 1965  H. R. DZIEDZIC  3,168,322
CHUCKING DEVICE FOR MACHINE TOOL SPINDLE AND
TOOL HOLDER FOR USE THEREWITH
Filed Oct. 18, 1962  4 Sheets-Sheet 1

INVENTOR.
HARRY R. DZIEDZIC
BY
Brown, Jackson, Boettcher & Dienner
ATTYS.

Feb. 2, 1965    H. R. DZIEDZIC    3,168,322
CHUCKING DEVICE FOR MACHINE TOOL SPINDLE AND
TOOL HOLDER FOR USE THEREWITH
Filed Oct. 18, 1962    4 Sheets-Sheet 2
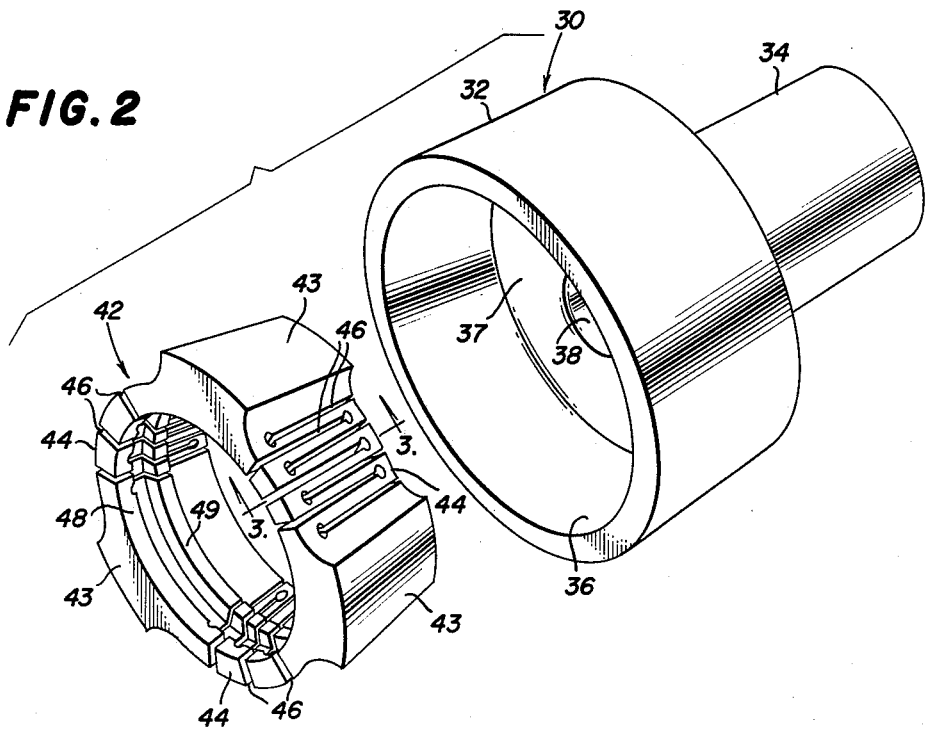
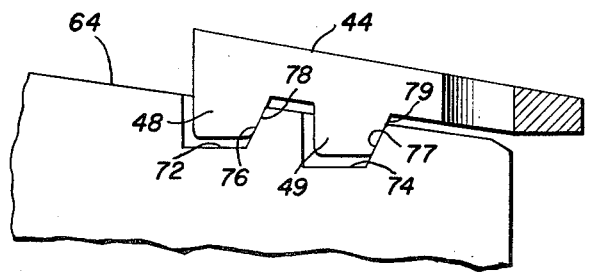
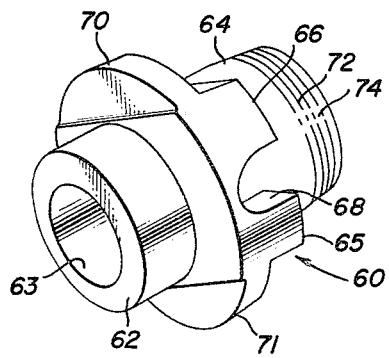
INVENTOR.
HARRY R. DZIEDZIC
BY Brown, Jackson, Boettcher & Dienner
ATTYS.

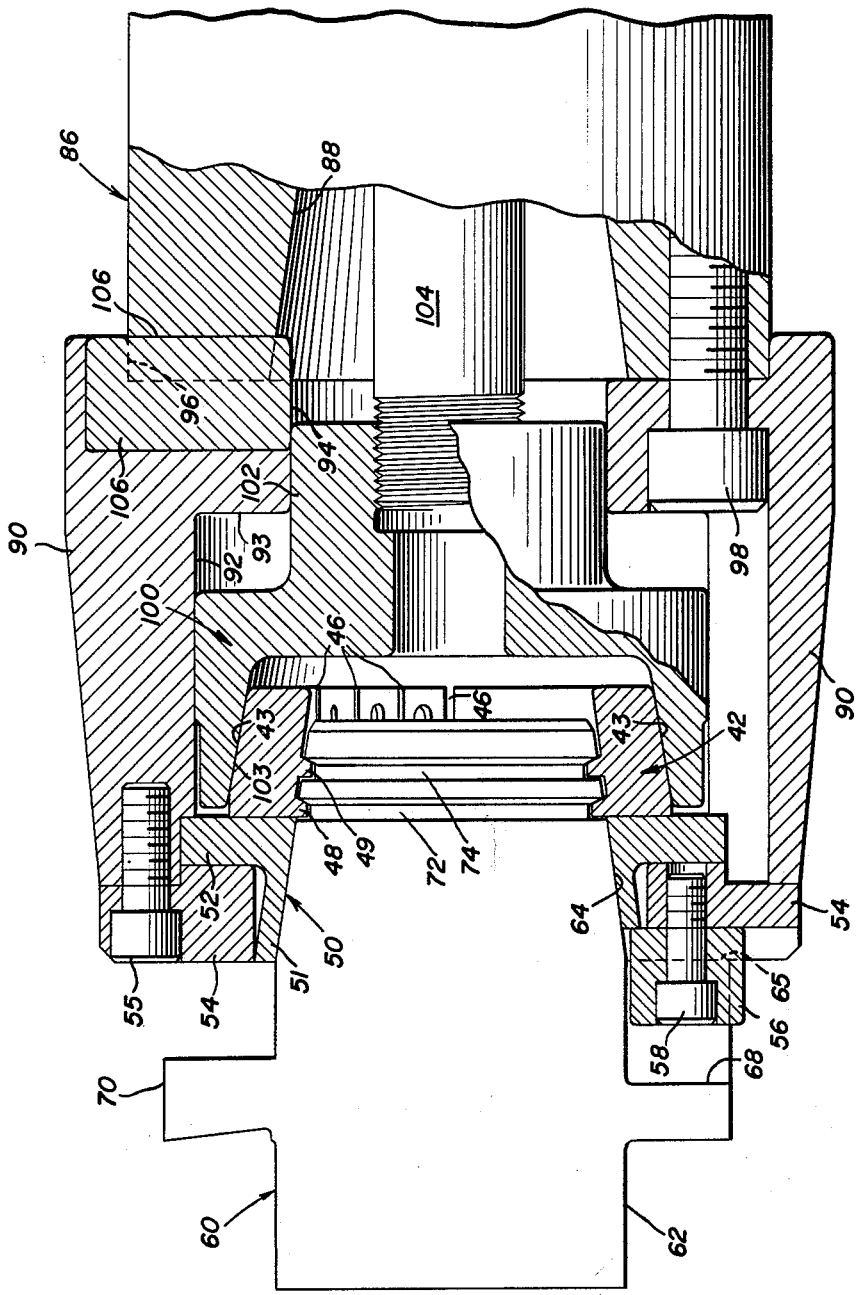

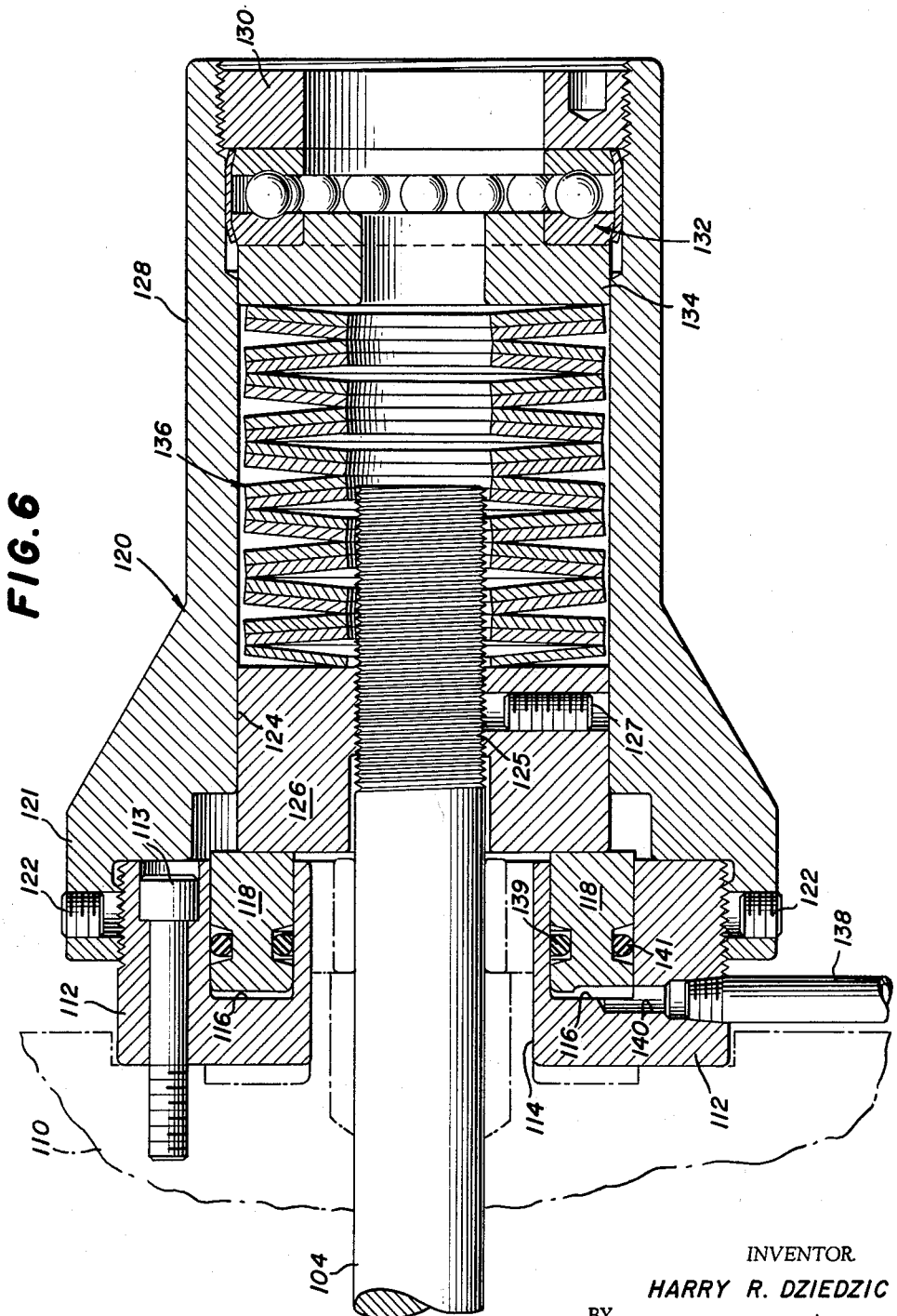

United States Patent Office 3,168,322
Patented Feb. 2, 1965

3,168,322
CHUCKING DEVICE FOR MACHINE TOOL
SPINDLE AND TOOL HOLDER FOR USE
THEREWITH
Harry R. Dziedzic, Glenview, Ill., assignor to Scully-Jones and Company, Chicago, Ill., a corporation of Illinois
Filed Oct. 18, 1962, Ser. No. 231,358
12 Claims. (Cl. 279—4)

The present invention relates to a chucking device adapted to be associated with a machine tool spindle for holding a tool or the like therein.

More specifically, the invention relates to a chucking device comprising an annular collet member adapted to be housed in a machine tool spindle so as to be held against forward axial movement and having internal rib means adapted to cooperate with a corresponding annular groove formed in the shank of a tool holder or tool associated therewith. In accordance with the invention, the collet is normally expanded to a first position wherein the rib means is disposed radially outwardly of the annular groove in the tool holder shank so as to permit entry of the shank into the collet, and the collet is compressible upon application of force thereto to a second position wherein the rib is disposed within the annular groove to provide a positive axial lock between the tool holder shank and the collet.

The chucking device of the present invention has general utility for use with a machine tool spindle to hold a tool holder or tool or the like. However, the device is especially adapted for use in automatic tool changing systems, particularly where data controlled machine tools are employed. One automatic tool changing system with which the present invention may be used to advantage is described in a copending application of Myron L. Anthony and Bernard R. Better entitled "Apparatus and Method for Automatic Tool Changing," Serial No. 178,060, filed Mar. 7, 1962.

It is an object of the present invention to provide a chucking device which is adapted to effect positive axial locking between the chuck and a member to be held therein.

Another object of the invention is to provide a chucking device as mentioned above wherein the force required to effect locking between the chuck and a member being held therein is relatively small in relation to the force required to remove the member being held from the chuck when the latter is in locked position.

A further object is to provide a chucking device comprising a locking collet which is normally radially expanded to an open position and which is radially compressible to a closed or locked position upon application of force thereto.

Still another of my objects is to provide a chucking device as last above-mentioned including an actuator which is adapted to compress the collet to a closed position when moved axially forwardly and to permit the collet to expand to an open position when moved axially rearwardly.

A further object is to provide a tool holder for use with my chucking device having a shank portion which is provided with at least one annular groove adapted to cooperate with a collet having a corresponding annular rib or lug thereon.

A still further object of the invention is to provide a tool holder having a relatively short shank portion so as to render it particularly adapted for use in conjunction with automatic tool changing systems.

An additional object is to provide a chucking device and tool holder adapted to cooperate in such a manner that when the tool holder is locked in the chuck it is displaced axially rearwardly so as to be drawn further into an associated machine tool spindle into a seated position therein.

Still another object of the invention is to provide a machine tool spindle assembly having my novel chucking device embodied therein.

Other objects, uses and advantages of the invention will become apparent, or be obvious, from the following specification, particularly when considered in connection with the drawings in which:

FIGURE 2 is an exploded perspective view showing a collet member and an actuator member for controlling the expansion and contraction of the collet;

FIGURE 3 is an enlarged partial section taken substantially along the line 3—3 of FIGURE 2 showing internal rib or lug members provided on the collet, and further showing in dash-dot lines a fragmentary portion of a tool holder shank having annular grooves therein for cooperation with the rib members;

FIGURE 4 is a reduced perspective view of a tool holder having a pair of annular grooves provided in its shank portion in accordance with the invention;

FIGURE 5 is a longitudinal section, partly broken away, showing an alternative embodiment wherein a standard machine tool spindle is adapted for use with present invention; and FIGURE 6 is a longitudinal section, partly broken away, showing mechanism for operating the device of FIGURE 1.

Figure 1:
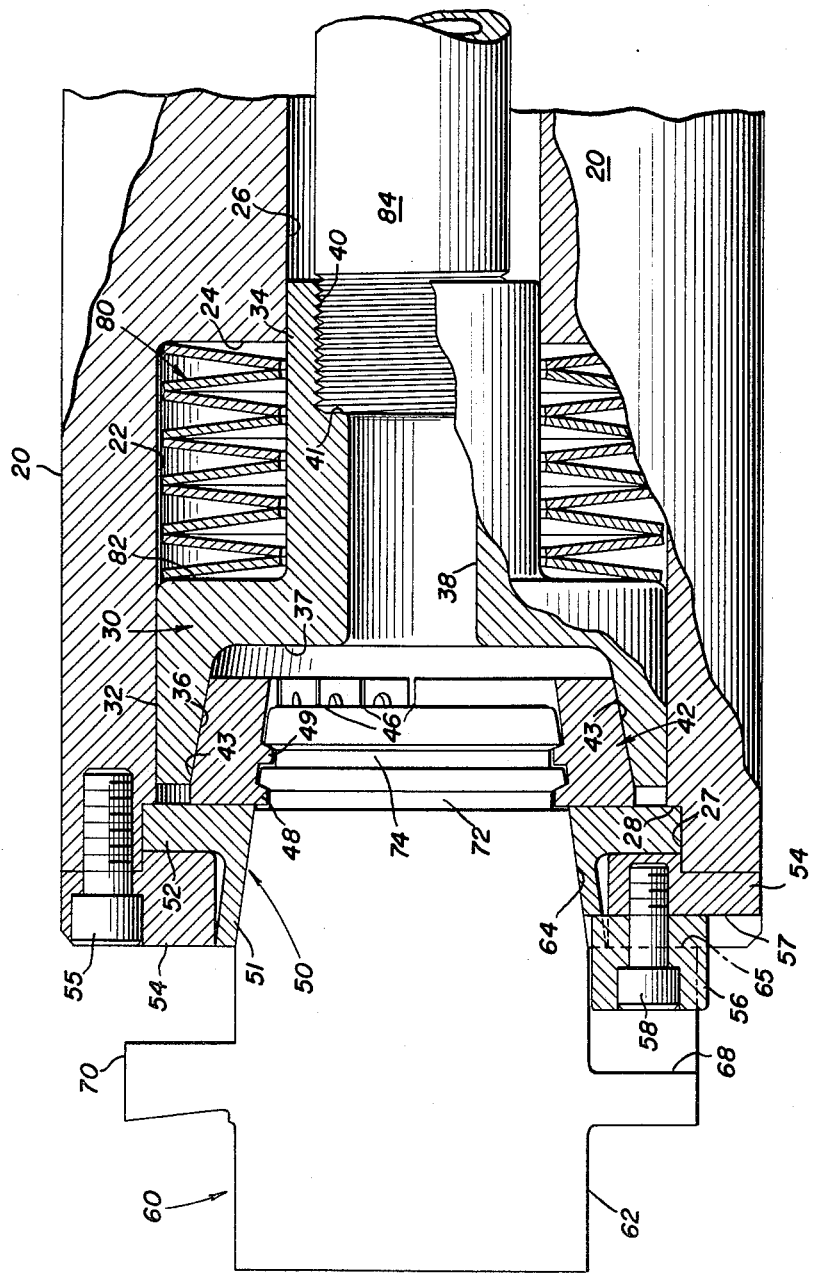
FIGURE 1 is a longitudinal section, partly broken away, showing a machine tool spindle embodying the chucking device of the present invention and showing a tool holder locked in the chucking device, the tool holder being shown partially schematically and in dash-dot lines.

It should be understood that when reference is made herein and in the appended claims to a "tool holder," such term should be interpreted to include tools, tool holders, and work pieces, since it will be readily apparent that the annular groove or grooves formed on the tool holder of the present invention for cooperation with corresponding rib means provided on a locking collet, may, if desired, be formed directly on a tool or on a work piece which is to be held in the chucking device.

Referring now to the drawings, FIGURE 1 shows a fragmentary portion of a machine tool spindle 20 having an axial bore 22 in its forward end which terminates at a peripheral shoulder 24, and a reduced diameter bore 26 which extends rearwardly from the shoulder 24. The forward end of the spindle 20 is provided with a counterbore 27 which terminates at a ledge 28.

An actuator, indicated generally at 30, is housed within the bore 22 for axial sliding movement within the spindle 20. The actuator comprises a cylindrical portion 32 having a diameter slightly less than the diameter of the bore 22, and an integral reduced diameter shank portion 34 which is adapted to slide within the spindle bore 26. The cylindrical portion 32 is provided at its forward end with a tapered or frusto-conical recess 36 which terminates at an annular base or ledge 37. The shank 34 of the actuator is provided with an axial bore 38, which in the embodiment being described communicates with the recess 36 and extends the full length of the shank. The rear end of the shank 34 is counterbored and tapped so as to form a threaded hole 40 which terminates at a peripheral ledge 41.

A collet member indicated generally at 42 is received within the recess 36. As best shown in FIGURE 2, the collet 42 comprises an annular or ring-shaped member having three circumferentially spaced outer bearing surfaces 43 between which there are provided ring sections 44 of reduced thickness in which there are formed a plurality of staggered slots 46. The outer bearing surfaces 43 are tapered to correspond substantially to the configuration of the wall of the frusto-conical recess 36 in the actuator 30, and the outer bearing surfaces taken together define a frusto-conical outer surface for the collet member 42.

The collet 42 is provided with a pair of interior annular ribs or locking lugs 48 and 49 which in the embodiment being described extend around the full inner circumference of the collet except where interrupted by the plurality of staggered slots 46. It will be seen that due to the reduced thickness of the collet sections 44 and the provision of the staggered slots 46 therein, the collet 42 is adapted to be compressed circumferentially and thus also radially so as to move the annular ribs 48 and 49 radially inwardly. The collet 42 is shown in FIGURE 2 in its relaxed or normally expanded position, but when the collet is positioned within the actuator recess 36 and the actuator is moved axially forwardly with respect to the collet to the relative position shown in FIGURE 1, the collet is compressed radially so as to move the ribs 48 and 49 to locked position, as will be explained more fully hereinafter.

A centering ring 50 comprises an annular tapered or frusto-conical wall 51 and an integral annular flange 52 which extends radially outwardly from the rear end of the wall 51. The flange 52 fits within the counterbore 27 in the spindle 20 so as to bear against the shoulder 28, and the centering ring is held in position by an annular cover plate 54 which bears against the centering ring and which is secured to the front end of the spindle by a plurality of cap screws, one of which is shown at 55.

The annular tapered wall of the ring 50 is relatively thin and resilient so as to be adapted to expand when a tool holder or the like is seated therein in order to provide accurate centering of the latter. A more complete description of such centering rings may be found in Bernard R. Better Patent No. 3,041,898, issued July 3, 1962. It will be noted that the rear face of the flange 52 abuts the forward end of the collet member 42 so as to prevent the collet from moving axially forwardly relative to the spindle 20.

The front cover plate 54 is provided with a pair of keys, one of which is shown at 56, for providing a positive drive connection with a tool holder which is mounted in the spindle 20. The key 56 is mounted in a slot 57 formed in the cover plate and is secured to the plate 54 by a cap screw 58.

FIGURE 4 shows a tool holder 60 comprising a forward socket portion 62 which is provided with an axial bore 63 for receiving a tool (not shown), and a rear tapered shank portion 64 which is adapted to be seated in a socket of a machine tool spindle, such as in the centering ring 50 shown in FIGURE 1. The tool holder 60 includes stop means comprising bearing surfaces 65 and 66 which are adapted to seat against the front cover plate 54 when the tool holder is inserted in the spindle 20 and locked therein. Similar bearing surfaces are provided at the opposite side of the tool holder, and a pair of recesses, one of which is shown at 68, are provided to receive the keys 56 which are secured to the cover plate 54. In the particular embodiment being described, the tool holder 60 further includes a pair of gripping flanges 70 and 71 adapted to cooperate with gripping means which form a part of an automatic tool changing system, as is fully described in the above-identified copending application Serial No. 178,060.

In accordance with one important feature of the present invention, the tool holder 60 is provided at the rear end of the shank 64 with a pair of annular grooves 72 and 74 which are adapted to cooperate with the internal collet ribs 48 and 49 to effect a positive axial lock between the collet 42 and the tool holder. FIGURE 1 shows the tool holder 60 partially schematically in dot-dash lines and as there shown the holder is mounted in the centering ring 50 and is locked in position by the collet member 42 so as to hold the bearing surfaces 65 and 66 seated against the front face of the cover plate 54, with the keys 56 disposed within the recesses 68.

In operation, the actuator 30 is moved axially to a position rearwardly of that shown in FIGURE 1 in order to permit the collet 42 to open. Such rearward movement of the actuator may be produced by fluid pressure means which will be described hereinafter. When the actuator is thus moved rearwardly, the collet 42 is permitted to expand radially to an open position wherein the annular ribs 48 and 49 will be disposed radially outwardly of the grooves 72 and 74 formed in the shank 64 of the tool holder. With the collet 42 in its relaxed or open position, the tool holder 60 may be inserted into the spindle 20 so that the tapered shank portion 64 is seated in the centering ring 50, and the rear end of the shank 64 is disposed within the collet 42 with the grooves 72 and 74 in approximate axial alignment with the corresponding ribs 48 and 49. Such insertion of the tool holder into the spindle may be done manually, or it may be done by automatic tool transfer mechanism which cooperates with the gripping flange 70.

The tool holder of the present invention is particularly adapted for use with automatic tool changing systems because the relatively short length of the shank portion 64 permits the use of shorter movements when the holder is being inserted in a spindle or removed therefrom. Regarding the taper of the shank 64, it should be understood that while a portion of the shank should be tapered to cooperate with a socket such as the centering ring 50, it is not necessary to taper the rear portion of the shank where the annular grooves are formed, and if desired the latter portion may be straight.

Once the tool holder 60 has been inserted in the spindle 20 as described above, the actuator 30 is moved axially forwardly to the position shown in FIGURE 1 whereby the frusto-conical wall 36 acts upon the bearing surfaces 43 of the collet 42 so as to radially compress the collet causing the annular ribs 48 and 49 to enter the grooves 72 and 74 in the tool holder shank and thereby provide a positive axial lock between the tool holder 60 and the collet 42.

Referring to FIGURES 1 and 3, it is important to note that the annular grooves 72 and 74 in the tool holder shank are formed so as to provide rear groove walls 76 and 77 which are inclined with respect to a radial plane, and the internal ribs 48 and 49 are provided with annular rear walls 78 and 79 which are inclined at an angle corresponding approximately to the inclination of the groove walls. Accordingly, as the annular ribs 48 and 49 are moved into the grooves 72 and 74 upon compression of the collet 42, the rear rib walls engage the rear groove walls and effect a rearward axial displacement or pulling in of the tool holder 60 into the spindle. Such pulling in of the tool holder 60 may only amount to a rearward displacement on the order of 0.032 inch, but it is sufficient to expand the centering ring 50 and to cause the stop means or bearing surfaces 65 and 66 on the tool holder to seat against the front face of the spindle cover plate 54.

Thus, upon the forward axial movement of the actuator 30, the tool holder is pulled into the ring 50 and accurately centered relative to the spindle 20, it is seated against the front face 54 of the spindle, and it is axially locked in position by the collet 42, the latter being held against outward axial movement by the flange 52 and cover plate 54. It has been found that a relatively small force is needed to move the actuator 30 forwardly and hold it in locked position, whereas a force several times greater is required to open the actuator or shear off the annular ribs 48 and 49, as would be necessary to pull out the tool holder when the latter is locked in position.

In the embodiment shown in FIGURE 1, compression spring means comprising a plurality of Belleville spring washers 80 are mounted in series on the shank portion 34 of the actuator between the annular edge 24 on the spindle and an annular bearing surface 82 on the actuator 30 so as to bias the actuator forwardly relative to the spindle toward its locking position. A draw bar 84 is threaded into the rear end of the actuator shank 34 and extends toward the rear of the machine tool where hydraulic means may be provided for moving the draw bar 84 rearwardly to open the collet 42. Such hydraulic means will be described hereinafter.

FIGURE 5 illustrates an alternative embodiment of the invention which is particularly useful where it is desired to adapt standard existing spindles for use with the novel chucking device described herein. Several of the components in the embodiment of FIGURE 5 are substantially identical to corresponding elements of FIGURE 1, and will thus be identified by corresponding numerals. There is shown a spindle 86 comprising a standard type of machine tool spindle having a tapered socket 88. In order to adapt such a spindle for use with the chucking device of the present invention, there is provided a housing or spindle extension 90 having an axial bore 92 in its front end which terminates at an annular ledge 93, and a reduced diameter bore 94 which extends from the ledge 93 through to the rear of the housing. The rear end of the housing 90 is provided with a counterbore 96 which permits the housing to be mounted over the end of the spindle 86, the housing being secured to the spindle by a plurality of cap screws such as shown at 98.

An actuator 100 is positioned within the bore 92 for axial sliding movement within the housing 90, and the actuator has a rear shank portion 102 adapted to slide in the bore 94, and a forward frusto-conical recess 103 for controlling the expansion and contraction of the collet 42 in the manner previously described. In the present embodiment, there are no compression spring means mounted adjacent the actuator 100, since both forward and rearward movements of the actuator are controlled through a draw bar 104 which has one end threaded into the rear end of the actuator shank 102. In addition to securing the housing 90 to the spindle 86 by a plurality of cap screws 98, there are also provided key means such as shown at 106 for producing a positive drive connection between the spindle and the housing.

FIGURE 6 shows mechanism for controlling the forward and rearward axial movements of the draw bar 104. There is shown in dash-dot lines a fragmentary portion of a rear wall 110 of a machine tool housing. A cylinder 112 is secured to the stationary wall 110 by a plurality of cap screws such as shown at 113. The cylinder 112 has an axial bore 114 to accommodate the draw bar 104 and bearings therefor, and it is further provided with an annular recess 116 in which an annular piston 118 is mounted for axial sliding movement.

A spring housing 120 has an enlarged forward end portion 121 which is threaded over the rear end of the stationary cylinder 112 and secured in position thereon by a plurality of set screws 122. The spring housing 120 has an axial bore 124 into which a threaded end 125 of the draw bar 104 projects. An actuator nut 126 is threaded on the draw bar end 125 and held thereon by a set screw 127 so as to bear against the rear face of the annular piston 118. The rear of the spring housing 120 comprises a generally cylindrical portion 128 closed at its end by a nut 130 which is threaded into the end thereof. A thrust ball bearing assembly 132 is positioned within the cylindrical portion 128 immediately forwardly of the nut 130, and a bearing ring 134 is disposed adjacent the forward side of the ball bearing assembly.

Compression spring means comprising a plurality of Belleville spring washers 136 are mounted in parallel-series within the cylindrical housing portion 128 between the rear face of the actuator nut 126 and the forward face of the bearing ring 134 so as to bias the draw bar 104 forwardly and thus bias the actuator 100 of FIGURE 5 toward its locking position. It will be noted that upon rotation of the spindle 86, the draw bar 104 will rotate therewith, along with the actuator nut 126, the spring washers 136, and the bearing ring 134, all of which are free to rotate relative to the spring housing 120.

In order to move the actuator 100 rearwardly so as to permit the collet 42 of FIGURE 5 to expand to its open position, hydraulic means are provided for moving the draw bar 104 against the force of the spring washers 136. FIGURE 6 shows a hydraulic line 138 connected to a conduit 140 in the cylinder 112 so as to communicate with the annular recess 116 in the cylinder. A pair of O rings 139 and 141 are provided to effect a seal between the piston 118 and the cylinder 112. It will be understood that when fluid under pressure is conducted to the recess 116, it will cause the annular piston 118 to be moved axially rearwardly, and due to engagement between the piston and the actuator nut 126 the draw bar 104 will be moved rearwardly. In this manner, conduction of fluid under pressure through the hydraulic line 138 will cause the actuator 100 to be moved rearwardly and thereby cause the collet 42 to be expanded to open position, and release of such fluid pressure will permit the spring washers 136 to move the actuator 100 forwardly so as to compress the collet 42 to closed or locked position.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. A chucking device adapted to be associated with a machine tool spindle for holding a tool or the like, comprising, in combination, a tool holder having a shank portion which is provided with at least one annular groove, an annular collet member adapted to be housed within a machine tool spindle so as to be held against forward axial movement and having internal rib means adapted to cooperate with said groove when said tool holder is inserted in said spindle, said collet member normally being expanded to a first position wherein said rib means is disposed radially outwardly of said groove so as to permit entry of said shank into said collet and being compressible upon application of force thereto to a second position wherein said rib is disposed within said groove to provide a positive axial lock between said shank and said collet, and means for applying force to said collet to move the same to said second position.

2. A chucking device adapted to be associated with a machine tool spindle for holding a tool or the like, comprising, in combination, a tool holder having a shank portion which is provided with at least one annular groove, an annular collet member adapted to be housed within a machine tool spindle so as to be held against forward axial movement and having internal rib means adapted to cooperate with said groove when said tool holder is inserted in said spindle, said collet member normally being expanded to a first position wherein said rib means is disposed radially outwardly of said groove so as to permit entry of said shank into said collet and being compressible upon application thereto of a radially inward force to a second position wherein said rib is disposed within said groove to provide a positive axial lock between said shank and said collet, and means substantially encircling said collet for applying a radially inward force to said collet to move the same to said second position.

3. A chucking device adapted to be associated with a machine tool spindle for holding a tool or the like, comprising, in combination, a tool holder having a shank portion which is provided with at least one annular groove, an annular collet member adapted to be housed within a machine tool spindle so as to be held against forward axial movement and having a frusto-conical external surface and internal rib means adapted to cooperate with said groove when said tool holder is inserted in said spindle, said collet member normally being expanded to a first position wherein said rib means is disposed radially outwardly of said groove so as to permit entry of said shank into said collet and being compressible upon application to said external surface of a radially inward force to a second position wherein said rib is disposed within said groove to provide a positive axial lock between said shank and said collet, and actuator means having an internal frusto-conical end portion substantially encompassing said collet member and in engagement with the external surface thereof whereby upon axial movement of said actuator in one direction said collet is compressed to said second position and upon movement of said actuator in the opposite direction said collet is permitted to expand to said first position.

4. The invention of claim 3 wherein compression spring means is provided for yieldingly urging said actuator in a forward axial direction to compress said collet to said second position and wherein fluid pressure means is provided for moving said actuator in a rearward axial direction to permit said collet to expand to said first position.

5. A chucking device adapted to be associated with a machine tool spindle for holding a tool or the like, comprising, in combination, a tool holder having a shank portion which is provided with at least one annular groove the rear wall of which is inclined with respect to a radial plane, an annular collet member adapted to be housed within a machine tool spindle so as to be held against forward axial movement and having an internal rib the rear wall of which is inclined at approximately the same inclination as said groove wall and is adapted to cooperate with said groove wall when said tool holder is inserted in said spindle, said collet member normally being expanded to a first position wherein said rib is disposed radially outwardly of said groove so as to permit entry of said shank into said collet and being compressible upon application thereto of a radially inward force to a second position wherein said rib is disposed within said groove to provide a positive axial lock between said shank and said collet and also to provide a rearward axial displacement of said shank due to engagement between said groove wall and said rib wall, and means substantially encircling said collet for applying a radially inward force to said collet to move the same to said second position.

6. The invention of claim 5 wherein said tool holder has stop means thereon adapted to be seated against the front end of said spindle when said tool holder is displaced axially rearwardly due to engagement between said groove wall and said rib wall.

7. A chucking device adapted to be associated with a machine tool spindle for holding a tool or the like, comprising, in combination, a tool holder having a tapered shank provided adjacent its rear end with at least one annular groove the rear wall of which is inclined with respect to a radial plane, an annular frusto-conical collet member adapted to be housed within a machine tool spindle so as to be held against forward axial movement and having an internal rib the rear wall of which is inclined at approximately the same inclination as said groove wall and is adapted to cooperate with said groove wall when said tool holder is inserted in said spindle, said collet member normally being expanded to a first position wherein said rib is disposed radially outwardly of said groove so as to permit entry of said tapered shank into said collet and being compressible upon application thereto of a radially inward force to a second position wherein said rib is disposed within said groove to provide a positive axial lock between said shank and said collet and also to provide a rearward axial displacement of said shank due to engagement between said groove wall and said rib wall, and actuator means having an internal frusto-conical end portion encompassing said collet member and in engagement with the external surface thereof whereby upon axial movement of said actuator in a forward direction said collet is compressed to said second position and upon axial movement of said actuator in a rearward direction said collet is permitted to expand to said first position.

8. A machine tool spindle and chucking assembly for holding a tool or the like, comprising, in combination, a spindle having a bore in the front end thereof, an actuator axially slidable in said bore and having a frusto-conical opening in the front end thereof, an annular frusto-conical collet member disposed at least partially within said actuator opening and having an internal rib the rear wall of which is inclined with respect to a radial plane, means secured to said spindle for preventing forward axial movement of said collet, a tool holder having a tapered shank portion and having a rear shank portion which is provided with at least one annular groove the rear wall of which is inclined at approximately the same inclination as said rib wall and which is adapted to cooperate with said rib wall when said tool holder is inserted in said spindle, said collet member normally being expanded to a first position wherein said rib is disposed radially outwardly of said groove to permit entry of said rear shank portion into said collet and being compressible upon forward axial movement of said actuator to a second position wherein said rib is disposed within said groove to provide a positive axial lock between said shank and said collet and also to provide a rearward axial displacement of said shank due to engagement between said groove wall and said rib wall.

9. The invention of claim 8 wherein a centering ring is mounted within said spindle bore forwardly of said collet member so as to hold said collet member against forward axial movement, said centering ring being provided with a frusto-conical inner surface adapted to seat said tapered shank portion when said tool holder is inserted in said spindle whereby upon said rearward axial displacement of said shank said centering ring will be expanded.

10. The invention of claim 8 wherein compression spring means is provided for biasing said actuator forwardly so as to bias said collet to said second position and wherein fluid pressure means is provided for moving said actuator rearwardly to permit said collet to expand to said first position.

11. The invention of claim 9 wherein said tool holder has stop means thereon adapted to be seated against the front end of said spindle when said tool holder is displaced axially rearwardly due to engagement between said groove wall and rib wall.

12. Chucking apparatus adapted to be associated with a machine tool spindle for holding a tool holder or the like of a type having a shank provided with at least one annular groove, comprising, in combination, an annular collet member adapted to be housed within a machine tool spindle so as to be held against forward axial movement and having a frusto-conical external surface and internal rib means adapted to cooperate with said groove when a tool holder is inserted in said spindle, said collet member normally being expanded to a first position wherein said rib means is disposed radially outwardly of said groove so as to permit entry of said shank into said collet and being compressible upon application to said external surface of a radially inward force to a second position wherein said rib is disposed within said groove to provide a positive axial lock between said shank and said collet, and actuator means having an internal frusto-conical end portion encompassing said collet member and in engagement with the external surface thereof whereby upon axial movement of said actuator in a forward direction said collet is compressed to said second position and upon axial movement of said actuator in a rearward direction said collet is permitted to expand to said first position.

References Cited in the file of this patent

UNITED STATES PATENTS

| | | |
|---|---|---|
| 2,320,360 | Grey | June 1, 1943 |
| 2,461,579 | Thomas | Feb. 15, 1949 |
| 2,507,587 | Bjorklund | May 16, 1950 |
| 2,873,120 | Stein | Feb. 10, 1959 |
| 2,998,259 | Farnsworth | Aug. 29, 1961 |